United States Patent
Lindoff (10) Patent No.: US 7,546,136 B2
(45) Date of Patent: Jun. 9, 2009

(54) VARIABLE TRANSMIT POWER CONTROL STRATEGIES FOR HIGH-SPEED DOWNLINK PACKET ACCESS SYSTEMS

(75) Inventor: Bengt Lindoff, Bjärred (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 637 days.

(21) Appl. No.: 11/118,569

(22) Filed: Apr. 29, 2005

(65) Prior Publication Data

US 2006/0246937 A1    Nov. 2, 2006

(51) Int. Cl.
*H04B 7/00* (2006.01)
*H04Q 7/20* (2006.01)

(52) U.S. Cl. .................. 455/522; 455/69; 455/517; 455/127.1

(58) Field of Classification Search .......... 455/522, 455/69, 442, 343.1, 127.1, 452.1, 67.11, 455/127.5, 517, 126, 502, 68, 515, 500, 13.4, 455/574; 370/320, 332, 335, 345, 311, 318
See application file for complete search history.

(56) References Cited

U.S. PATENT DOCUMENTS

| | | | |
|---|---|---|---|
| 5,305,349 A | 4/1994 | Dent | |
| 6,363,104 B1 | 3/2002 | Bottomley | |
| 6,771,965 B2 | 8/2004 | Hamabe | |
| 6,801,565 B1 | 10/2004 | Bottomley et al. | |
| 7,248,837 B2 * | 7/2007 | Woo ............... | 455/69 |
| 2001/0028677 A1 | 10/2001 | Wang et al. | |
| 2003/0114181 A1 | 6/2003 | Lee et al. | |
| 2003/0128673 A1 | 7/2003 | Lee et al. | |
| 2003/0185159 A1 | 10/2003 | Seo et al. | |
| 2003/0207696 A1 | 11/2003 | Willenegger et al. | |
| 2004/0058700 A1 | 3/2004 | Nilsson et al. | |
| 2004/0116143 A1 | 6/2004 | Love et al. | |
| 2004/0166884 A1* | 8/2004 | Oh et al. ............... | 455/522 |
| 2004/0203985 A1 | 10/2004 | Malladi et al. | |
| 2004/0219920 A1 | 11/2004 | Love et al. | |

(Continued)

FOREIGN PATENT DOCUMENTS

EP    1223769 A1    7/2002

(Continued)

OTHER PUBLICATIONS

Section 5.1.2.2.2.3, 3GPP Technical Specification (TS) 25.214 (V6. 2.0) Rel. 6 (2004).

(Continued)

*Primary Examiner*—John J Lee
(74) *Attorney, Agent, or Firm*—Potomac Patent Group PLLC (57) ABSTRACT

In communication systems that send transmit power control (TPC) commands in one direction so that only enough transmit power is used to maintain sufficient quality in the opposite direction, the TPC commands can be used to obtain information about the quality of the opposite-direction link. If there is sufficient quality, the number of TPC "up" commands is about the same as the number of TPC "down" commands, and if there is poor quality, more TPC "up" commands are received than "down" commands. A user equipment can use this information to adjust its TPC strategy and reduce the risk of poor reception and loss of synchronization to a communication node, such as a serving node for high-speed downlink packet access.

19 Claims, 5 Drawing Sheets

U.S. PATENT DOCUMENTS

| | | |
|---|---|---|
| 2004/0242255 A1 | 12/2004 | Hayashi et al. |
| 2004/0248606 A1 | 12/2004 | Suzuki et al. |
| 2005/0043051 A1* | 2/2005 | Takano et al. ............... 455/522 |
| 2005/0105647 A1 | 5/2005 | Wilhelmsson et al. |
| 2005/0250526 A1* | 11/2005 | Lindoff et al. .............. 455/522 |

FOREIGN PATENT DOCUMENTS

| | | |
|---|---|---|
| EP | 1313231 A1 | 5/2003 |
| EP | 1313232 A1 | 5/2003 |
| EP | 1313334 A2 | 5/2003 |
| EP | 1341318 A2 | 9/2003 |
| EP | 1351411 A1 | 10/2003 |
| EP | 1363413 A1 | 11/2003 |
| EP | 1313334 A3 | 6/2004 |
| EP | 1507343 A | 2/2005 |
| WO | 02/056505 A1 | 7/2002 |
| WO | 03/096572 A2 | 11/2003 |
| WO | 2004/019513 A1 | 3/2004 |
| WO | 2004/019518 A1 | 3/2004 |
| WO | 2004/072673 A2 | 8/2004 |
| WO | 2004/088899 A2 | 10/2004 |
| WO | 2004/088899 A3 | 10/2004 |

OTHER PUBLICATIONS

PCT International Search Report, mailed Sep. 11, 2006, in connection with International Application No. PCT/EP2006/003259.

PCT Written Opinion, mailed Sep. 11, 2006, in connection with International Application No. PCT/EP2006/003259.

Nortel Networks: "Enhanced HS-DPCCH power control in soft handover" TSG-RAN Working Group 1 Meeting #27, [Online] No. R1-020929, Jul. 2, 2002, pp. 1-8, XP002395284 Oulu, Finland.

"HS-DPCCH Power Control in Soft-Handoff" 3GPP TSG RAN WG 1, No. 26, May 13, 2002, pp. 1-12, XP002229771.

Ghosh, A. et al., "Control channel design for high speed downlink shared channel for 3GPP W-CDMA, Rel-5", 57th IEEE Semiannual Vehicular Technology Conference, VTC 2003, vol. 3, p. 2085-9, IEEE Piscataway, NJ, USA. ISBN 0 7803 7757 5. (Abstract).

Lee, J.H. et al., "Uplink power control scheme for reliable feedback signalling in HSDPA", Mobile Communications 7th CDMA International Conference, CIC 2002, Revised Papers p. 41-50, 2003, Springer-Verlag, Berlin, Germany. ISBN 3 540 00732 6. (Abstract).

"Reduction of DL channel quality feedback rate for HSDPA" TSG-RAN Working Group 1 Meeting #19, Feb. 27-Mar. 2, 2001, Las Vegas, NV, USA. TSGR1#19(01)0231.

"Reduction of DL channel quality feedback rate for HSDPA (revision of R1-01-231)" TSG-RAN Working Group 1 Meeting #19, Feb. 27-Mar. 2, 2001, Las Vegas, NV, USA. TSGR#19(01)0338.

* cited by examiner

$SIR_{204} < SIR_{206}$

FIG. 3A $SIR_{204} > SIR_{206}$
Event 1D

VARIABLE TRANSMIT POWER CONTROL STRATEGIES FOR HIGH-SPEED DOWNLINK PACKET ACCESS SYSTEMS

BACKGROUND

This invention relates to electronic digital communication systems and more particularly to radiotelephone systems.

Digital communication systems include time-division multiple access (TDMA) systems, such as cellular radio telephone systems that comply with the GSM telecommunication standard and its enhancements like GSM/EDGE, and code-division multiple access (CDMA) systems, such as cellular radio telephone systems that comply with the IS-95, cdma2000, and wideband CDMA (WCDMA) telecommunication standards. Digital communication systems also include "blended" TDMA and CDMA systems, such as cellular radio telephone systems that comply with the universal mobile telecommunications system (UMTS) standard, which specifies a third generation (3G) mobile system being developed by the European Telecommunications Standards Institute (ETSI) within the International Telecommunication Union's (ITU's) IMT-2000 framework. The Third Generation Partnership Project (3GPP) promulgates the UMTS and WCDMA standards. This application focusses on WCDMA systems for simplicity, but it will be understood that the principles described in this application can be implemented in other digital communication systems.

WCDMA is based on direct-sequence spread-spectrum techniques, with pseudo-noise scrambling codes and orthogonal channelization codes separating base stations and physical channels (terminals or users), respectively, in the downlink (base-to-terminal) direction. Since all users share the same radio resource in CDMA systems, it is important that each physical channel does not use more power than necessary. This is achieved by a transmit power control (TPC) mechanism, in which, among other things, base stations send TPC commands to users in the downlink (DL) direction and the users implement the commands in the uplink (UL) direction and vice versa. The TPC commands cause the users to increase or decrease their transmitted power levels by increments, thereby maintaining target signal-to-interference ratios (SIRs) for the dedicated physical channels (DPCHs) between the base stations and the users. WCDMA terminology is used here, but it will be appreciated that other systems have corresponding terminology. Scrambling and channelization codes and transmit power control are well known in the art.

Figure 1:
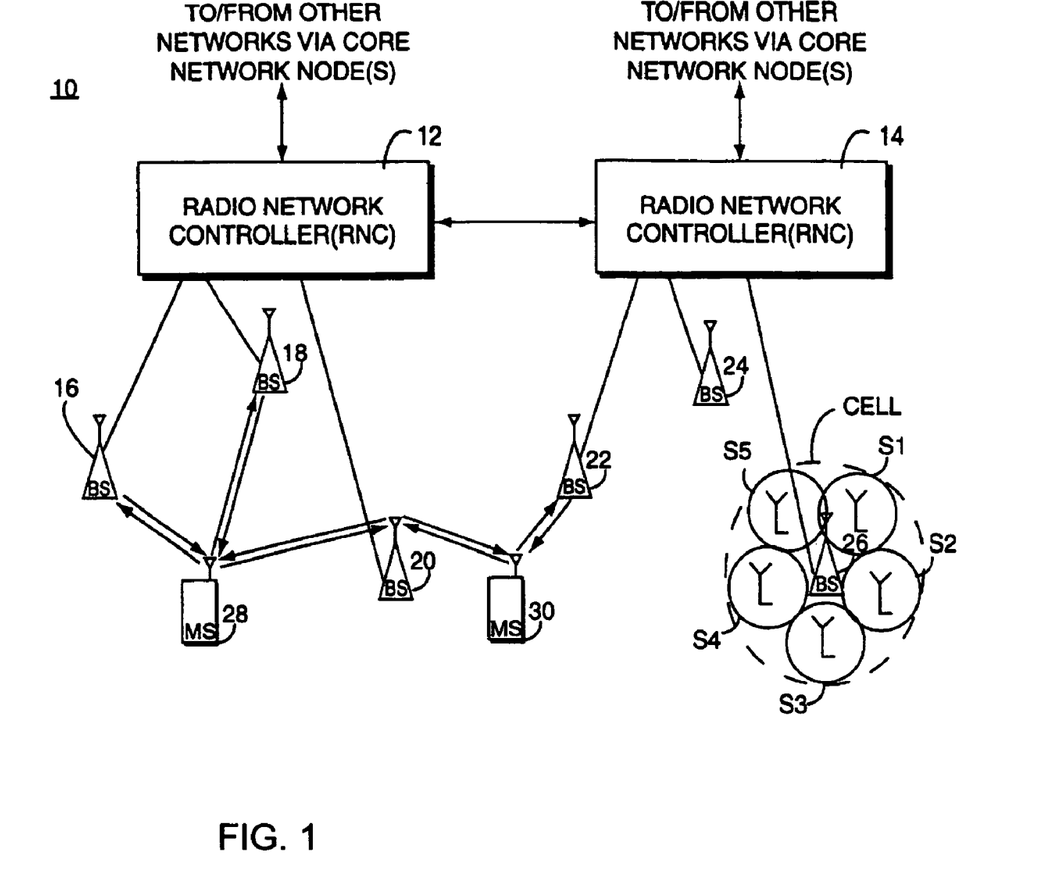
FIG. 1 depicts a mobile radio cellular telecommunication system.

FIG. 1 depicts a mobile radio cellular telecommunication system 10, which may be, for example, a WCDMA communication system. Radio network controllers (RNCs) 12, 14 control various radio network functions, including for example radio access bearer setup, diversity handover, etc. More generally, each RNC directs mobile station (MS), or user equipment (UE), calls via the appropriate base station(s) (BSs), which communicate with each UE through DL, or forward, and UL (i.e., mobile-to-base, or reverse) channels. RNC 12 is shown coupled to BSs 16, 18, 20, and RNC 14 is shown coupled to BSs 22, 24, 26. Each BS, which is called a Node B in 3GPP parlance, serves a geographical area that can be divided into one or more cell(s). BS 26 is shown as having five antenna sectors S1-S5, which can be said to make up the cell of the BS 26. The BSs are coupled to their corresponding RNCs by dedicated telephone lines, optical fiber links, microwave links, etc. Both RNCs 12,14 are connected with external networks such as the public switched telephone network (PSTN), the Internet, etc. through one or more core network nodes, such as a mobile switching center (not shown) and/or a packet radio service node (not shown).

High-speed downlink packet access (HSDPA) is a further evolution of WCDMA communication systems that provides higher bit rates, e.g., up to more than 10 megabits per second (Mb/s), by using higher order modulation, e.g., 16-ary quadrature amplitude modulation (16-QAM), multiple spreading codes, e.g., up to fifteen codes with spreading factors of 16, and DL-channel feedback information. HSDPA is described in the Release 5 version of the system specifications promulgated by the 3GPP. The DL-channel feedback information is information sent by a UE to a BS through the UL channel regarding the DL channel's quality. The BS uses that information to optimize the DL modulation and coding for optimized throughput.

HSDPA also employs a hybrid automatic repeat request (ARQ) scheme on the physical layer in order to reduce the round-trip delay of erroneous received packets. The hybrid ARQ scheme involves transmission by the UE of acknowledgment (ACK) and non-acknowledgment (NACK) messages to the BS providing HSDPA service. This BS may be called the "serving" BS or cell. The HS-channels in the DL are transmitted only from the HSDPA serving cell, and HSDPA UL control signaling (including ACK/NACK and DL-channel quality reports) is detected by only the HSDPA serving cell.

As user terminals move with respect to the base stations, and possibly vice versa, on-going connections are maintained through a process of hand-off, or handover. For example in a cellular telephone system, as a user moves from one cell to another, the user's connection is handed over from one base station to another. Early cellular systems used hard handovers (HHOs), in which a first cell's base station (covering the cell that the user was leaving) would stop communicating with the user just as the second base station (covering the cell that the user was entering) started communication. Modern cellular systems typically use diversity, or soft, handovers (SHOs), in which a user is connected simultaneously to two or more base stations. In FIG. 1, MSs 28, 30 are shown communicating with plural base stations in diversity handover situations. MS 28 communicates with BSs 16, 18, 20, and MS 30 communicates with BSs 20, 22. A control communication link between the RNCs 12, 14 permits diversity communications to/from the MS 30 via the BSs 20, 22.

During SHOs, terminals receive TPC commands from more than one base station, and methods have been developed for handling conflicts between TPC commands from different base stations. Conflicts are expected because as a UE leaves one cell, that cell's base station receives a progressively weaker signal and thus that base station's TPC commands call for more power, and at the same time, the UE may be entering a new cell, and the new cell's base station receives a progressively stronger signal and thus the new base station's TPC commands call for less power. In a 3GPP-compliant system, the UE combines TPC commands from reliable downlinks with a logical OR function, which leads to reduced UE transmit power if any of the reliable commands says "DOWN". This is described in Section 5.1.2.2.2.3 of 3GPP Technical Specification (TS) 25.214 (V6.2.0) Rel. 6 (2004), Physical layer procedures (FDD).

Figure 2:
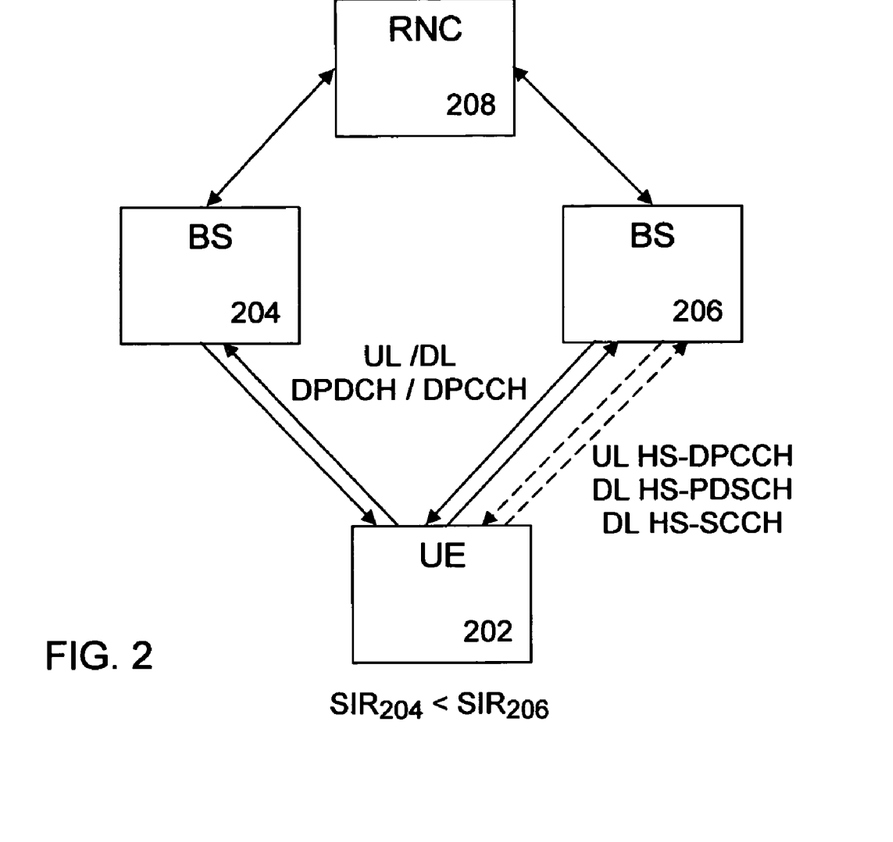
FIG. 2 depicts a UE in a SHO situation for non-HSDPA channel(s) and using services transported through HSDPA channels.

HSDPA can be used in mobility situations, e.g., where a UE and the BS(s) move with respect to one another, but soft handover is not specified for HSDPA channels. HSDPA channels support only hard handover. Therefore, there can be many situations in which a UE uses SHO for its DPCH(s) at the same time that it uses HHO for its HSDPA channel(s). FIG. 2 depicts a typical one of those situations in which a UE is in a SHO situation for non-HSDPA channel(s) and is using services transported through HSDPA channels.

Figure 3A:
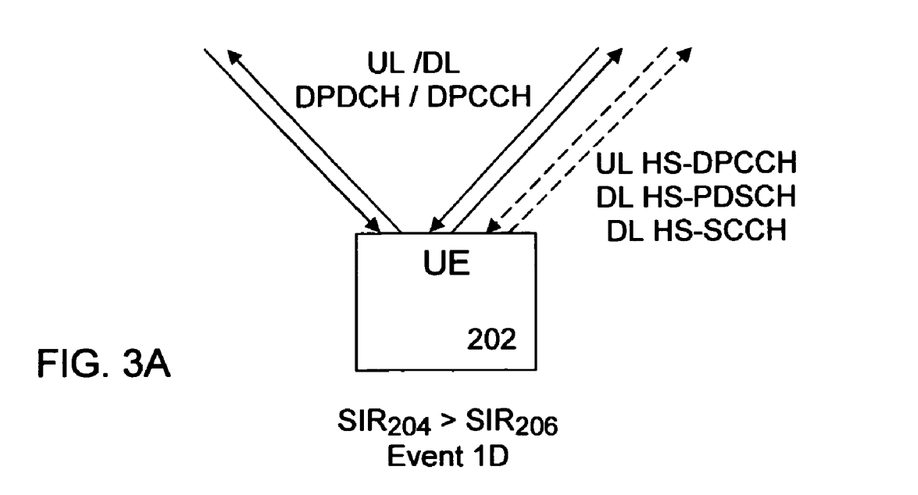
FIGS. 3A, 3B depict handover of HSDPA channel(s)

FIG. 3A is similar to FIG. 2 in that it depicts a UE 202 having multiple simultaneous connections with BS 204 and a BS 206 via dedicated physical data channels (DPDCHs) and dedicated physical control channels (DPCCHs) in the UL and the DL. In other words, the UE 202 is in SHO with respect to these non-HSDPA channels. The DPDCH carries higher-layer network signaling and possibly also speech and/or video services. The DPCCH carries physical-layer control signaling (e.g., pilot symbols/signals, TPC commands, etc.). An RNC 208 (not shown in FIG. 3A) controls BS 204 and BS 206.

The UE 202 also has HSDPA channels, but these are provided by only the serving cell, which in FIG. 3A is BS 206 because the SIR of BS 206 is larger than the SIR of BS 204. As noted above, SHO is not specified for the HSDPA channels. The downlink HSDPA channels include an HS-Packed Data Shared Channel (HS-PDSCH) that carries HS data packets and the HS-Shared Control Channel (HS-SCCH) that carries control information for the data packets. The uplink HSDPA channels include an HS-Dedicated Physical Control Channel (HS-DPCCH) that carries the ACK/NACK reports and DL-channel quality information.

Although SHO is not available for HSDPA channels, the UE measures the average SIR (e.g., $E_c/I_0$) of the Common Pilot Channels (CPICHs) it receives from all cells in its Active Set on a regular basis (typically five times per second), and the cell having the best SIR on these non-HSDPA channels is designated as the HSDPA serving cell.

Figure 3B:
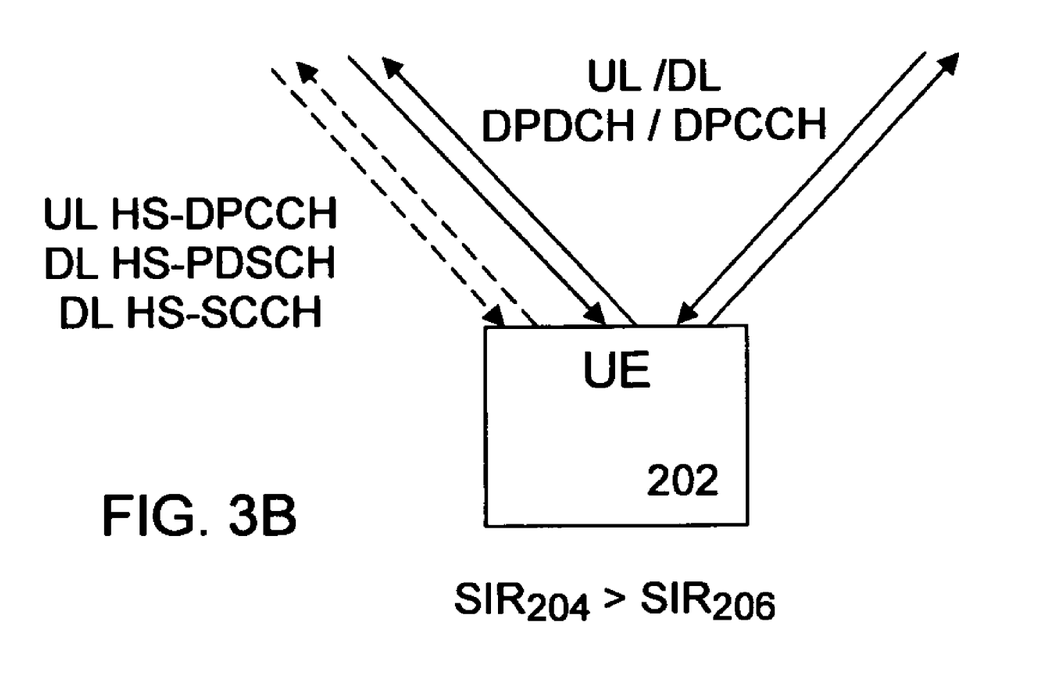

As depicted in FIG. 3A, the UE 202 determines an average SIR of the DL from BS 204 that is larger than the SIR measured for BS 206. This triggers an event 1D (change of best cell) and transmission of a Layer-3 radio resource control (RRC) message on the UL DPDCH. For a short time after the event 1D is triggered, the HS channels are still transmitted from the BS 206. The RNC receives the event-1D message and transmits a "change of HS serving cell message" to the UE as a Layer-3 RRC message on the DL DPDCH. The "change" message includes information about a time instant at which the HS channels will (hard) hand over to the BS 204. When the UE has received the "change" message, it transmits an ACK message on the UL DPDCH to the BSs 204, 206 and the RNC 208. In FIG. 3B, the HSDPA HHO has taken place, and the BS 204 is the serving cell transmitting and receiving the HS channels.

The UE's measurements of average SIRs of DL non-HSDPA channels can cause anomalies in HSDPA operations. It can sometimes briefly be so that the BS 204 has a better SIR than the BS 206. In addition, the UL and DL fade independently of each other, and therefore it can also be so that the UL to BS 204 has better quality than the UL to BS 206 even while the DL from BS 204 has lower quality than the DL from BS 206.

As mentioned above, the DPDCHs/DPCCHs are under transmit-power control and support SHO, and so the power control during SHO is based on a combination of TPC commands. The HS-DPCCH is power-controlled, but with an offset to the DPCCH UL that is set by higher layer signaling. While the DPCHs are in soft handover and considering the independent fading of channels, the combination of the TPC commands may be driven by base stations that do not include the HSDPA serving cell and so the HSDPA power control may be inappropriate. Indeed, in order to have the SHO capacity gain, it is sufficient if only one BS can hear the UE sufficiently well to achieve sufficient quality of service, and thus it could be so that the UL to the HSDPA serving cell is the cell having the weakest signal and another UL to a non-serving cell is the UL that directs power control on the HSDPA channel(s).

These behaviors can result in poor HS-DPCCH reception performance and erroneous ACK/NACK messaging and DL-channel quality detection, all of which can significantly reduce throughput on the HSDPA channel(s). Accordingly, attempts have been made to eliminate these problems.

One approach, taken by the 3GPP standards, is to specify a transmit power on the HS-DPCCH that is greater than the transmit power on the DPCHs. Nevertheless, all UL synchronization (i.e., path searcher and channel estimation) is done on the UL DPCCH. Therefore, if the reception of the DPCCH becomes poor enough, a loss of synchronization can result and the HS detection cannot be done regardless of the HS-DPCCH power! Lower HS throughput is a result.

Another approach is to do UL power control only on the HS serving cell, but doing so loses the SHO gain and greatly reduces the system's communication capacity. Therefore, this approach is not allowed by the 3GPP standards.

Another approach is to vary the data rate on the HS channels according to the channel quality. European Patent Application No. EP 1363413A1 by Hayashi et al., for example, describes a mobile communication system that uses the required transmission power on a DPCH as a control indicator for varying the data rate of the HS-PDSCH. As stated in the document, the HS radio link condition is expected to be good with the DL transmission power of a DPCH at a low level, and therefore fast transmission of data signals can be implemented and the risk of degradation of communication quality is low even if the transmission rate of HS-PDSCH is set high. Conversely, the radio link condition is expected to be bad with the DL transmission power of the DPCH at a high level, and therefore adequate communication quality cannot be maintained unless the transmission rate of data signals with HS-PDSCH is lowered.

Aspects of power control of HS channels during SHO of DPCHs are described in a number of documents, including U.S. Patent Application Publication No. US 2004/0203985 by Malladi et al. and International Patent Publication No. WO 2004/019513A1 to Whinnet et al. The document by Malladi et al. states that uplink power control is provided to maintain the integrity of the uplink HS-DPCCH when a UE goes into SHO. A RNC controls a target signal-to-noise-ratio threshold of a pilot signal based on the pilot signal strength of the serving node and/or the uplink channel condition of the serving node.

SUMMARY

This application describes methods and apparatus that reduce a UE's risk of poor reception and loss of synchronization of the UL to the HSDPA serving cell during soft handover, even while it is still sufficient that one BS hears the DPDCH/DPCCH.

In one aspect of the invention, there is provided a UE in a communication system. The UE includes a device that recovers control symbols intended for the UE, where the control symbols include TPC commands directed to the UE from at least two transmitting nodes, one of the transmitting nodes being a serving node for a predetermined communication service. The UE also includes a TPC command filter configured to generate a ratio signal from TPC commands directed to the UE from the serving node during a plurality of time slots, and a TPC combiner that is responsive to the ratio signal and is configured to receive TPC commands from the device. Based on the received commands and the ratio signal, a TPC control signal is generated that is used for controlling power transmitted by the UE. If the ratio signal crosses a first threshold, the TPC control signal is based on only TPC commands directed to the UE from the serving node.

In another aspect of the invention, there is provided a method in a UE of controlling power transmitted by the UE in an uplink in a communication system. The method includes the steps of receiving TPC commands from at least two communication nodes, where one of the communication nodes is a serving node for a predetermined communication service; generating a ratio signal from TPC commands received from the serving node during a plurality of time slots; and generating a TPC control signal, based on received TPC commands and the ratio signal, for controlling the power transmitted by the UE. If the ratio signal crosses a first threshold, the TPC control signal is based on only TPC commands received from the serving node.

In still another aspect of the invention, there is provided a computer-readable medium containing a computer program for controlling power transmitted by a UE in an uplink in a communication system. The computer program performs the steps of generating a TPC command ratio signal from TPC commands received from a serving node during a plurality of time slots; and generating a TPC control signal, based on TPC commands received from the serving node and at least one other communication node and on the TPC command ratio signal, for controlling the power transmitted by the UE. If the ratio signal crosses a first threshold, the TPC control signal is based on only TPC commands received from the serving node.

BRIEF DESCRIPTION OF THE DRAWINGS

The various aspects, features, and advantages of this invention will be understood by reading this description in conjunction with the drawings, in which.

DETAILED DESCRIPTION

In any communication system that uses transmit power control with the intent to use only enough power for each UL (and DL) to maintain sufficient quality, the TPC commands transmitted in the DL from a BS can be used to obtain information about the quality of the UL to that particular BS. A WCDMA communication system is typical of such a communication system. When an UL has sufficient quality, the ratio of TPC up commands to TPC down commands is close to unity (i.e., about half of the TPC commands are "up" and about half are "down"). When an UL has low quality, more TPC "up" commands are transmitted on the DL than "down" commands. Accordingly, more TPC "up" commands during a certain time period from the HSDPA serving cell is information that may indicate a larger probability of bad HS-DPCCH detection.

A UE can use this information about UL quality in adjusting its power control strategy. For example, a UE can change its power control strategy, from the usual fixed strategy of combining TPC commands from all BSs in the Active Set and acting according to the combination, to a second strategy of setting its UL transmit power according to TPC commands from only the HSDPA serving cell when the up/down ratio of those commands is greater than a certain threshold, indicating the UL signal quality may be low. With such an adjustable TPC strategy, the UE's UL transmit power is increased only during those periods when the UL to the HS serving cell is poor, thereby optimizing the trade-off between the HS performance when the non-HS channel(s) are in SHO and the overall SHO capacity gain.

Figure 4:
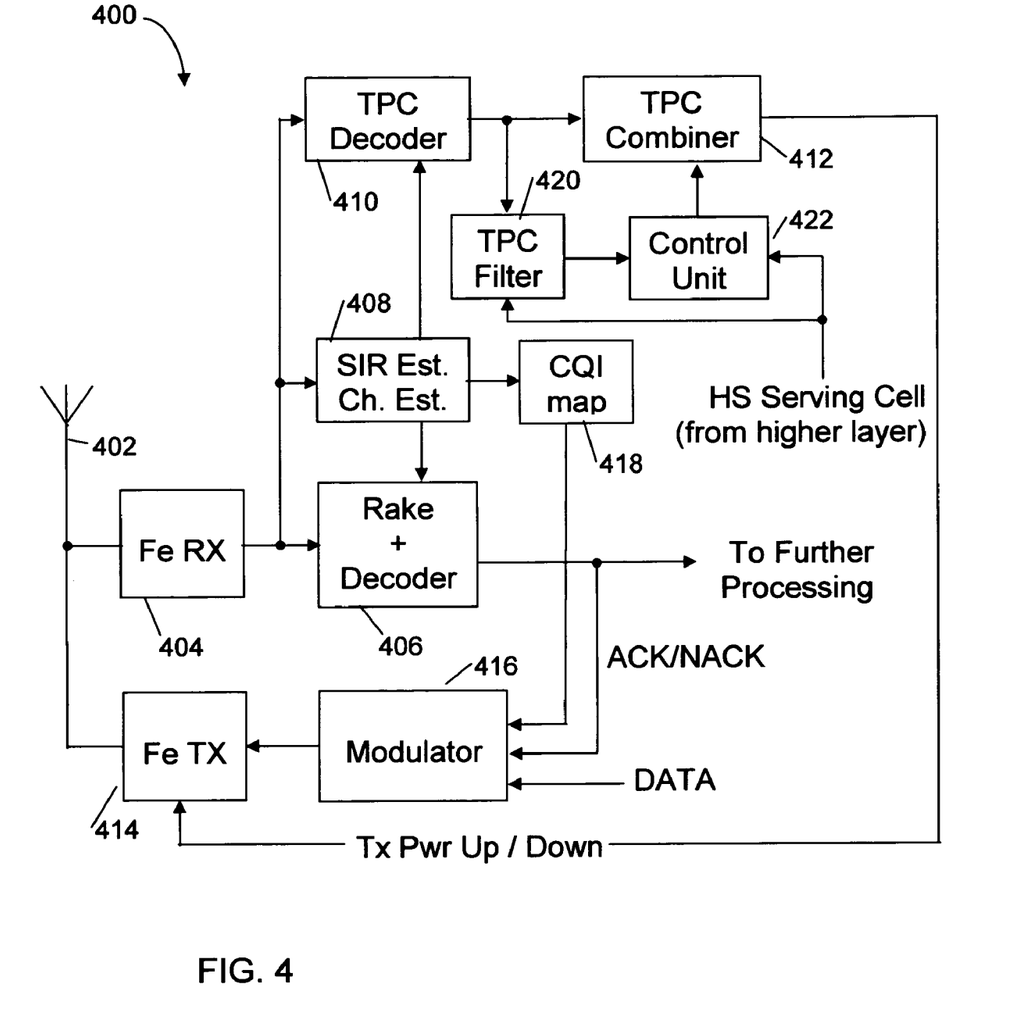
FIG. 4 is a block diagram of a portion of a UE.

FIG. 4 is a block diagram of a portion of UE 400 that is suitable for implementing the adjustable TPC strategy as described above when the UE is in connected mode and is operating in SHO and an HSDPA session is ongoing. Let $N_{bs}$ be the number of links the UE is simultaneously connected to (i.e., the number of base stations $BS_1, BS_2, \ldots, BS_{N_{bs}}$ in the Active Set), and let the HSDPA serving cell be the base station $BS_j$.

The UE 400, such as a mobile terminal in a WCDMA communication system, receives and transmits radio signals through an antenna 402 and for example down-converts and samples the received signals in a front-end receiver (Fe RX) 404. The output samples are fed from Fe RX 404 to a rake combiner and decoder 406 that de-spreads and combines received echoes of the data and control symbols, decodes the symbols appropriately, and passes the decoded symbols to further processing as appropriate for the particular communication system Rake combining and channel estimation are well known in the art. Aspects of rake receivers are described in U.S. Pat. No. 5,305,349 to Dent for "Quantized Coherent Rake Receiver"; U.S. Pat. No. 6,363,104 to G. Bottomley for "Method and Apparatus for Interference Cancellation in a Rake Receiver"; and U.S. Pat. No. 6,801,565 to G. Bottomley et al. for "Multi-Stage Rake Combining Methods and Apparatus"; and U.S. Patent Application Publication No. 2001/0028677 by Wang et al. for "Apparatus and Methods for Finger Delay Selection in Rake Receivers".

Output samples from the Fe RX 404 are also fed to a SIR and channel estimator 408, which estimates the SIR and impulse response of the DL radio channel, and to a TPC command decoder 410. Channel estimation is described in, for example, U.S. patent application Ser. No. 10/920,928 by L. Wilhelmsson et al. for "Channel Estimation by Adaptive Interpolation". The TPC decoder 410 recovers control symbols, including TPC commands from each node, such as a base station, to which the terminal is connected, and feeds TPC command streams to a TPC combiner 412 that combines the TPC commands from each link in the Active Set.

The TPC combiner 412 generates a combined TPC command that is provided to a front-end transmitter (Fe TX) 414, which uses it for increasing or decreasing the terminal's transmit power. If there is only one link in the Active Set, the combined TPC command is just the one detected TPC command stream for that particular link. Several methods of determining and of combining TPC commands are known, such as those described in U.S. Patent Application Publication No. 2004/00058700 by J. Nilsson et al. for "Methods, Receivers, and Computer Program Product for Determining Transmission Power Control Commands Using Biased Interpretation". The TPC combination is often based on the idea of "transmit power down if any reliable TPC command says down", and can be realized in many ways.

The signal provided by the Fe TX 414 is based on signals from a suitable modulator 416, which receives data to be transmitted and ACK/NACK signals as described above. The modulator 416 also receives signals from a channel quality index (CQI) mapper 418, which "maps", or converts, estimated SIR values of the CPICH or other suitable channel generated by the estimator 408 to corresponding CQI values. Through the modulator 416 and front-end transmitter 414, the UE 400 sends the CQI values to the respective base station as indications of the modulation and coding schemes that the BS could use. In a typical arrangement, a high SIR is mapped to a high CQI that indicates that a high code rate and more complex modulation, e.g., 16-QAM, could be used, and a low SIR is mapped to a low CQI that indicates that a low code rate and a less complex modulation, e.g., QPSK, could be used.

As seen in FIG. 4, a TPC filter 420 and a control unit 422 cooperate in determining the ratio of up/down commands during recent slots for the HSDPA serving cell and using a ratio signal to determine whether the TPC combiner 412 should implement the usual TPC command combination or that the UE's transmit power should be based on only the TPC commands from the HSDPA serving cell. It will be understood that although FIG. 4 shows the filter 420 and control unit 422 as separate devices, their functionalities can be combined and implemented by a single device, such as a suitably programmed or configured processor or circuit.

The TPC filter 420 and control unit 422 advantageously operate collectively as follows. The TPC "up/down" command ratio is measured for the HSDPA serving cell, which can be identified to the filter 420 and unit 422 by a suitable signal derived from higher-layer signaling. It is currently believed that the ratio can be determined by considering a time window that includes the preceding N slots, where 20<N<200. The ratio signal can then be simply the number of TPC "up" commands received during the N slots, divided by the total number N slots. Of course it will be appreciated that other forms of ratio signal could be used instead, e.g., the number of "down" commands received during the N slots, divided by N, with suitable other modifications. For another example, the form of the ratio signal could be the number of "up" commands received during N slots divided by or less the number of "down" commands received during the N slots. It may also be advantageous to consider the ratio in light of the size of N, so that a larger number of "up" commands or a larger change in the ratio is needed to indicate a poor-quality UL when N is smaller.

If the ratio signal is less than about 50-80% (for a ratio signal having the form of the number of "up" commands received during N slots divided by N), then the HS serving cell UL can be considered by the UE to be synchronized and the HS-DPCCH detection in the BS can be deemed to work well. In this case, the UE can use the standard SHO TPC combination algorithms, such as power down if any reliable TPC command says down. If such a ratio signal is greater than about 80%, then the UE can consider the HS serving cell UL to have poor quality and be probably nearly out of synchronization. In this case, the control unit 422 can decide that the UE's transmit power should be based only or primarily on the TPC commands from the HSDPA serving cell.

Those of ordinary skill in this art will understand that the above-described threshold values of about 80%, e.g., 50%-80%, are just examples and that other values could be used. It is currently believed that an UL having good quality is likely to have less than 60-70% "up" commands in a SHO situation, i.e., a situation in which there is more than one cell in the Active Set, and an UL having bad quality is likely to have nearly 100% TPC "up" commands. It will be appreciated that when there is only one cell in the Active Set, that one UL may also be expected to have a TPC up/down command ratio of 50%, more or less, when it has good quality. In the case of only one cell in the Active Set, however, the UE simply always follows the TPC commands from that cell.

The filter 420 can be implemented in many ways. For one example, the filter 420 may include a counter and a divider, where the counter tallies the "up" commands and the divider divides the number of "up" commands by the number of slots N. For another example, the filter 420 may include just a counter, where the counter count up one or down one according to the TPC command so that a count of zero corresponds to a ratio of 50%.

It should be understood that it is not necessary for the UE to change abruptly between strategies for handling TPC commands. It may be advantageous to provide a softer or smoother transition from transmit power control based on the usual strategy of combining TPC commands from all cells in the Active Set to transmit power control based on the new strategy of using TPC commands from only the HSDPA serving cell. Many ways to implement a soft transition are possible. As one example, let the TPC "up" command ratio be x. If x is less than about 60%, then use the usual strategy for SHO TPC command combination. If x is greater than about 60% and less than about 80%, control the transmit power in every third slot according to only the TPC commands from the HSDPA serving cell and use the usual strategy for the remaining slots. If x is greater than about 80% and less than about 90%, control the transmit power in every second slot (i.e., every other slot) according to only the TPC commands from the HSDPA serving cell and use the usual strategy for the remaining slots. If x is greater than about 90%, control the transmit power in every slot according to only the TPC commands from the HSDPA serving cell.

Figure 5:
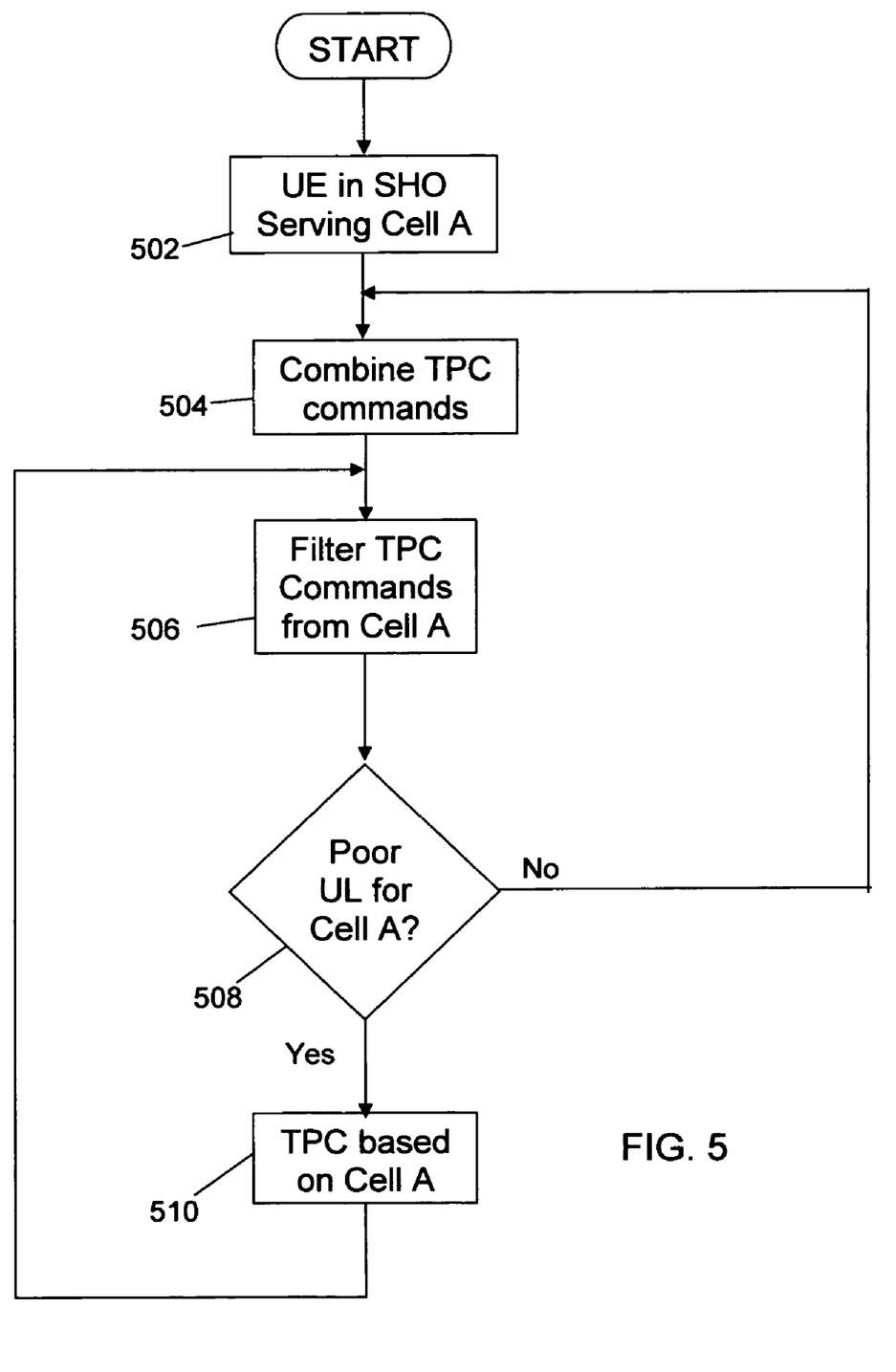
FIG. 5 is a flow chart of a method in accordance with the principles of this invention.

FIG. 5 is a flow chart of a method in accordance with the invention. In step 502, the UE is in SHO and the HS serving cell is BS A. In step 504, TPC commands are combined according to the usual strategy in SHO, and the result of the TPC command combination is used for adjusting the UE's transmit TX power "up" or "down" one increment in the next slot. In step 506, the stream of TPC commands received from BS A during the preceding N slots is filtered. If the resultant filter signal indicates that the UL to BS A is not poor quality (step 508), the flow returns to step 504. If however the quality of the UL to BS A is poor as indicated by a the TPC command ratio, the UE's transmit power is controlled in the next slot based on only the TPC command from BS A (step 510). The flow then returns to step 506, and another set of N TPC commands are filtered to determine the UL quality.

It will be appreciated that procedures described above are carried out repetitively as necessary, for example, to respond to the time-varying nature of communication channels between transmitters and receivers. To facilitate understanding, many aspects of this invention are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both.

Moreover, this invention can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, communicate, or transport the program for use by or in connection with the instruction-execution system, apparatus, or device. The computer-readable medium can be, for example but not limited to, an electronic, magnetic, optical, electromagnetic, infrared, or semiconductor system, apparatus or device. More specific examples (a non-exhaustive list) of the computer-readable medium include an electrical connection having one or more wires, a portable computer diskette, a random-access memory (RAM), a read-only memory (ROM), an erasable programmable read-only memory (EPROM or Flash memory), and an optical fiber.

Thus, the invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action.

It is emphasized that the terms "comprises" and "comprising", when used in this application, specify the presence of stated features, integers, steps, or components and do not preclude the presence or addition of one or more other features, integers, steps, components, or groups thereof.

The particular embodiments described above are merely illustrative and should not be considered restrictive in any way. The scope of the invention is determined by the following claims, and all variations and equivalents that fall within the range of the claims are intended to be embraced therein.

What is claimed is:

1. A user equipment (UE) in a communication system, comprising:
    a device that recovers control symbols intended for the UE, wherein the control symbols include transmit power control (TPC) commands directed to the UE from at least two transmitting nodes, one of the transmitting nodes being a serving node for a predetermined communication service;
    a TPC command filter configured to generate a ratio signal from TPC commands directed to the UE from the serving node during a plurality of time slots; and
    a TPC combiner that is responsive to the ratio signal and is configured to receive TPC commands from the device and, based on the received commands and the ratio signal, to generate a TPC control signal that is used for controlling power transmitted by the UE;
    wherein, if the ratio signal crosses a first threshold, the TPC control signal is based on only TPC commands directed to the UE from the serving node; and if the ratio signal does not cross the first threshold, the TPC control signal is based on a combination of the TPC commands directed to the UE from the at least two transmitting nodes.

2. The user equipment of claim 1, wherein the TPC command filter counts power-up commands received during the plurality of time slots.

3. The user equipment of claim 2, wherein the first threshold is about 0.8.

4. The user equipment of claim 2, wherein the TPC command filter counts power-down commands received during the plurality of time slots.

5. A user equipment (UE) in a communication system, comprising:
    a device that recovers control symbols intended for the UE, wherein the control symbols include transmit power control (TPC) commands directed to the UE from at least two transmitting nodes, one of the transmitting nodes being a serving node for a predetermined communication service;
    a TPC command filter configured to generate a ratio signal from TPC commands directed to the UE from the serving node during a plurality of time slots; and
    a TPC combiner that is responsive to the ratio signal and is configured to receive TPC commands from the device and, based on the received commands and the ratio signal, to generate a TPC control signal that is used for controlling power transmitted by the UE;
    wherein, if the ratio signal crosses a first threshold, the TPC control signal is based on only TPC commands directed to the UE from the serving node; and if the ratio signal crosses a second threshold and does not cross the first threshold, the TPC control signal is based on a combination of the TPC commands directed to the UE from the at least two transmitting nodes for a first number of time slots subsequent to the plurality of time slots and on only TPC commands directed to the UE from the serving node for a second number of time slots subsequent to the plurality of time slots.

6. The user equipment of claim 5, wherein the TPC command filter counts power-up commands received during the plurality of time slots.

7. The user equipment of claim 6, wherein the first threshold is about 0.9 and the second threshold is 0.6.

8. The user equipment of claim 5, wherein the communication system uses wideband code division multiple access and the predetermined communication service is a high-speed downlink packet access service.

9. A method in a user equipment (UE) of controlling power transmitted by the UE in an uplink in a communication system, comprising the steps of:
    receiving transmit power control (TPC) commands from at least two communication nodes, wherein one of the communication nodes is a serving node for a predetermined communication service;
    generating a ratio signal from TPC commands received from the serving node during a plurality of time slots; and
    generating a TPC control signal, based on received TPC commands and the ratio signal, for controlling the power transmitted by the UE;
    wherein, if the ratio signal crosses a first threshold, the TPC control signal is based on only TPC commands received from the serving node; and if the ratio signal does not cross the first threshold, the TPC control signal is based on a combination of the TPC commands received from the at least two communication nodes.

10. The method of claim 9, wherein the step of generating the ratio signal includes counting power-up commands received during the plurality of time slots.

11. The method of claim 10, wherein the first threshold is about 0.8.

12. The method of claim 10, wherein the step of generating the ratio signal includes counting power-down commands received during the plurality of time slots.

13. A method in a user equipment (UE) of controlling power transmitted by the UE in an uplink in a communication system, comprising the steps of:
    receiving transmit power control (TPC) commands from at least two communication nodes, wherein one of the communication nodes is a serving node for a predetermined communication service;

generating a ratio signal from TPC commands received from the serving node during a plurality of time slots; and generating a TPC control signal, based on received TPC commands and the ratio signal, for controlling the power transmitted by the UE;

wherein, if the ratio signal crosses a first threshold, the TPC control signal is based on only TPC commands received from the serving node; and if the ratio signal crosses a second threshold and does not cross the first threshold, the TPC control signal is based on a combination of the TPC commands received from the at least two communication nodes for a first number of time slots subsequent to the plurality of time slots and on only TPC commands received from the serving node for a second number of time slots subsequent to the plurality of time slots.

14. The method of claim 13, wherein the step of generating the ratio signal includes counting power-up commands received during the plurality of time slots.

15. The method of claim 14, wherein the first threshold is about 0.9 and the second threshold is about 0.6.

16. The method of claim 14, wherein the step of generating the ratio signal included counting power-down commands received during the plurality of time slots.

17. The method of claim 13, wherein the communication system uses wideband code division multiple access and the predetermined communication service is a high-speed downlink packet access service.

18. A computer-readable medium containing a computer program for controlling power transmitted by a user equipment (UE) in an uplink in a communication system, wherein the computer program performs the steps of:

generating a transmit power control (TPC) command ratio signal from TPC commands received from a serving node during a plurality of time slots; and generating a TPC control signal, based on TPC commands received from the serving node and at least one other communication node and on the TPC command ratio signal, for controlling the power transmitted by the UE;

wherein, if the ratio signal crosses a first threshold, the TPC control signal is based on only TPC commands received from the serving node; and if the TPC command ratio signal does not cross the first threshold, the TPC control signal is based on a combination of the TPC commands received from the serving node and the at least one other communication node.

19. A computer-readable medium containing a computer program for controlling power transmitted by a user equipment (UE) in an uplink in a communication system, wherein the computer program performs the steps of:

generating a transmit power control (TPC) command ratio signal from TPC commands received from a serving node during a plurality of time slots; and generating a TPC control signal, based on TPC commands received from the serving node and at least one other communication node and on the TPC command ratio signal, for controlling the rower transmitted by the UE;

wherein, if the ratio signal crosses a first threshold, the TPC control signal is based on only TPC commands received from the serving node; and if the TPC command ratio signal crosses a second threshold and does not cross the first threshold, the TPC control signal is based on a combination of the TPC commands received from the serving node and the at least one other communication node for a first number of time slots subsequent to the plurality of time slots and on only TPC commands received from the serving node for a second number of time slots subsequent to the plurality of time slots.

* * * * *

UNITED STATES PATENT AND TRADEMARK OFFICE
CERTIFICATE OF CORRECTION

| | | |
|---|---|---|
| PATENT NO. | : 7,546,136 B2 | Page 1 of 1 |
| APPLICATION NO. | : 11/118569 | |
| DATED | : June 9, 2009 | |
| INVENTOR(S) | : Lindoff | |

It is certified that error appears in the above-identified patent and that said Letters Patent is hereby corrected as shown below:

In Column 12, Line 23, in Claim 19, delete "rower" and insert -- power --, therefor.

Signed and Sealed this

Seventeenth Day of November, 2009

David J. Kappos
*Director of the United States Patent and Trademark Office*